Dec. 30, 1958  J. L. SHARP  2,866,520
BEARING LUBRICATOR
Filed May 28, 1957

INVENTOR.
John L. Sharp
BY Victor J. Evans & Co.
ATTORNEYS

United States Patent Office 2,866,520
Patented Dec. 30, 1958

2,866,520

BEARING LUBRICATOR

John L. Sharp, Ontario, Calif.

Application May 28, 1957, Serial No. 662,046

1 Claim. (Cl. 184—1)

This invention relates to a lubricator, and more particularly to a device for use in lubricating bearings.

The object of the invention is to provide a lubricator which is especially suitable for applying grease to bearings such as bearings used on wheels of vehicles.

Another object of the invention is to provide a bearing lubricator which is adapted to hold a plurality of bearings such as wheel bearings therein, whereby grease can be supplied from a suitable source of supply under pressure so that this grease can be evenly distributed throughout the bearings and wherein the plurality of bearings such as the vehicle wheel bearings, can be simultaneously lubricated.

A further object of the invention is to provide a bearing lubricator which is extremely simple and inexpensive to manufacture.

Other objects and advantages will be apparent during the course of the following description.

In the accompanying drawings, forming a part of this application, and in which like numerals are used to designate like parts throughout the same.

Figure 1:
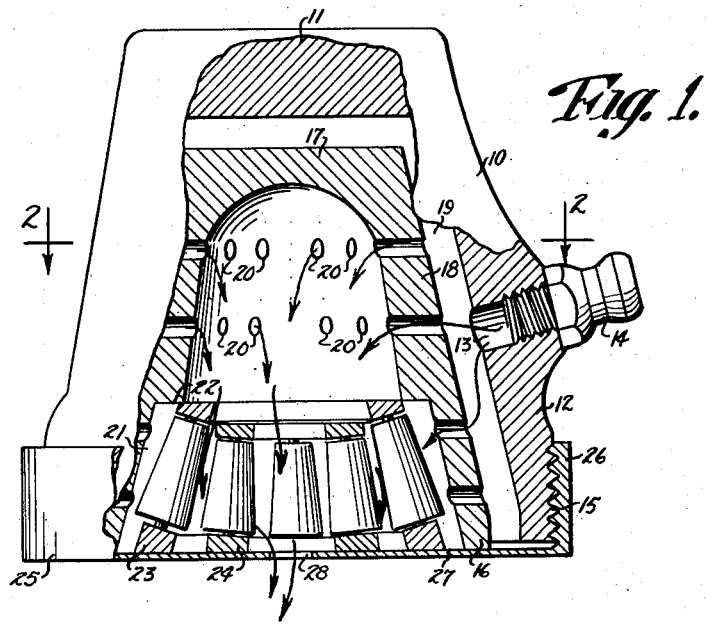
Figure 1 is an elevational view of the bearing lubricator, constructed according to the present invention, and with parts broken away and in sections.
Figure 2:
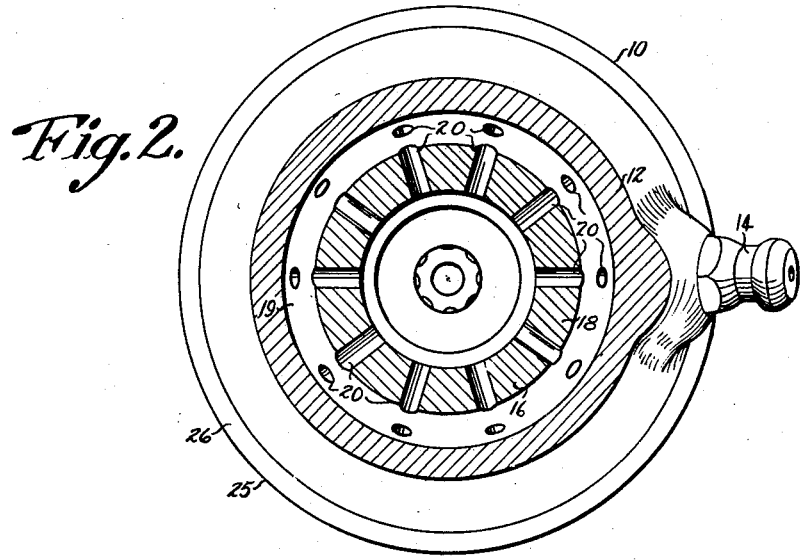
Figure 2 is a sectional view taken on the line 2—2 of Figure 1.

Referring in detail to the drawings, the numeral 10 indicates a hollow housing which forms a part of the lubricator of the present invention, and the housing 10 may have a frusto-conical shape and includes an end wall 11, and a continuous side wall 12. The side wall 12 is provided with an opening 13 which has a fitting 14 arranged in engagement therewith, and the fitting 14 is adapted to be connected to a suitable source of supply of lubricant or grease, as for example, a grease gun may be connected to the fitting 14 for supplying grease to the interior of the housing 10. An end portion of the housing 10 is threaded externally as at 15, for a purpose to be later described.

The lubricator of the present invention further includes a casing 16 which is positioned within the housing 10, and the casing 16 includes an end wall 17, and a continuous side wall 18. A small space is adapted to be left or provided between the casing 16 and the housing 10, and this space is indicated by the numeral 19 and is adapted to have lubricant such as grease pass therethrough. The placement of the casing 16 is accomplished by merely manually arranging the casing 16 in the housing 10, and since the casing 16 is smaller than the housing 10, there will necessarily result in a space 19 between the housing and casing.

The inner casing 16 is further provided with a plurality of spaced apart openings or apertures 20 whereby the grease from the passageway 19 can enter the casing 16, and there is provided within the casing 16, a chamber or recess 21 which defines a shoulder 22. Bearings such as the bearings 23 and 24 are adapted to be positioned in the chamber 21, and the lubricant is adapted to pass through the openings 20 and be distributed on the bearings 23 and 24 so as to properly lubricate these bearings. The bearings 23 and 24 may be the usual bearings which are found on wheels of vehicles such as automobiles, trucks or the like. There is provided a space in the lower inner portion of the casing 16, and this space is defined below the shoulder 22, as shown in Figure 1, and this space is adapted to receive therein the bearings 23 and 24 to be lubricated.

The lubricator of the present invention further includes a closure which is indicated generally by the numeral 25, and the closure 25 includes an annular flange 26 which threadedly engages the threaded portion 15 of the housing 10, and the closure 25 further includes an end piece or plate 27 which is provided with a central opening 28 which defines a vent.

From the foregoing, it is apparent that there has been provided a device which is especially suitable for use in lubricating bearings such as the bearings 23 and 24. In use, the bearings 23 and 24 which are to be lubricated, are adapted to be removed from the usual wheel spindles such as the wheel spindles of a vehicle, and then with the closure 25 removed, the pair of spindles 23 and 24 are adapted to be seated in the chamber 21 as shown in Figure 1 for example, so that these spindles 23 and 24 are arranged in concentric relation with respect to each other in the chamber 21. Then, with the parts assembled as shown in the drawing, the closure 25 is arranged on the housing 10 so that the flange 26 threadedly engages the portion 15 of the housing 10. Then, lubricant from a suitable source of supply under pressure such as a grease gun, is adapted to be supplied to the fitting 14, and this lubricant then passes through the fitting 14, and through the opening 13 into the space 19. This lubricant or grease then flows or passes through the passageway 19 and is evenly distributed into the interior of the casing 16 through the plurality of spaced apart openings 20. Thus, the grease will be distributed onto the pair of bearings 23 and 24 evenly whereby the grease will penetrate all portions of the bearings so that the bearings will be properly lubricated. Any used or dirty grease which was initially on the bearings will be expelled by the fresh grease and the used or dirty lubricant will pass out through the vent opening 28. After the pair of bearings 23 and 24 have been properly lubricated, the closure 25 is unscrewed from the housing 10, whereby the lubricated or grease bearings 23 and 24 can be put back on the wheel spindles of the vehicle.

The parts can be made of any suitable material and in different shapes or sizes. As previously described, the lubricator of the present invention is constructed so that the pair of bearings 23 and 24 can be lubricated at the same time, the bearings 23 and 24 being of different sizes. The grease is forced through the openings 20 onto the bearings being lubricated, and the passageway for the space 19 is defined by the clearance between the inner casing 16 and housing 10. This continuous space or passageway 19 permits the grease to be evenly distributed throughout the bearings by means of the plurality of spaced apart openings 20. Also, due to the provision of the closure 25, dust or other foreign matter will be prevented from accidentally entering the device and contaminating the bearings. If desired, the lubricator may be made of a suitable material such as a suitable metal.

The above description of the invention is for illustrative purposes only and it is understood that modifications may be made in the construction within the scope and spirit of the following claim.

I claim:

In a lubricator, a hollow housing having a frusto-conical shape and including an end wall and a continuous side wall, a fitting extending from said side wall and adapted to be connected to a source of lubricant, an end portion of said housing being threaded, a casing positioned within said housing, said casing being smaller than said housing so that a space is provided between the casing and housing, there being a plurality of spaced apart openings in said casing for the passage therethrough of lubricant, said casing being provided with a chamber for holding bearings to be lubricated, said chamber being of a size and shape so that bearings can be centrally arranged therein, and a closure including an end piece having a central opening therein, said closure further including an annular flange threadedly engaging the threaded portion of said housing.

References Cited in the file of this patent

UNITED STATES PATENTS

| | | |
|---|---|---|
| 2,652,843 | Schuchman | Sept. 22, 1953 |
| 2,710,669 | Monger | June 14, 1955 |